United States Patent
Schilling

(10) Patent No.: US 6,980,411 B2
(45) Date of Patent: Dec. 27, 2005

(54) TELECOM CIRCUIT PROTECTION APPARATUS

(75) Inventor: Robert Schilling, Dolgeville, NY (US)

(73) Assignee: Bel Fuse Incorporated, Jersey City, NJ (US)

( * ) Notice: Subject to any disclaimer, the term of this patent is extended or adjusted under 35 U.S.C. 154(b) by 0 days.

(21) Appl. No.: 10/857,324

(22) Filed: May 28, 2004

(65) Prior Publication Data

US 2004/0246645 A1 Dec. 9, 2004

Related U.S. Application Data

(60) Provisional application No. 60/476,051, filed on Jun. 4, 2003.

(51) Int. Cl.$^7$ ................................................. H01C 7/12
(52) U.S. Cl. ........................................................ 361/119
(58) Field of Search ............................................ 361/119

(56) References Cited

U.S. PATENT DOCUMENTS

| | | | | |
|---|---|---|---|---|
| 4,780,598 A | * | 10/1988 | Fahey et al. ................ | 219/511 |
| 4,939,498 A | * | 7/1990 | Yamada et al. ............. | 338/22 R |
| 5,142,265 A | * | 8/1992 | Motoyoshi et al. ........ | 338/22 R |
| 5,233,326 A | * | 8/1993 | Motoyoshi ................. | 338/22 R |
| 5,760,336 A | * | 6/1998 | Wang .......................... | 174/52.1 |
| 5,818,676 A | * | 10/1998 | Gronowicz, Jr. ........... | 361/106 |
| 5,963,423 A | * | 10/1999 | Ikeda .......................... | 361/690 |
| 6,169,472 B1 | * | 1/2001 | Kahr ........................... | 338/22 R |
| 6,377,435 B1 | * | 4/2002 | Nabell et al. ............... | 361/119 |
| 6,507,264 B1 | * | 1/2003 | Whitney ...................... | 337/159 |
| 6,628,498 B2 | * | 9/2003 | Whitney et al. ............ | 361/119 |
| 2002/0089408 A1 | * | 7/2002 | Walsh et al. ................ | 338/22 R |
| 2004/0136136 A1 | * | 7/2004 | Walsh et al. ................ | 361/106 |

* cited by examiner

*Primary Examiner*—Brian Sircus
*Assistant Examiner*—James A. Demakis
(74) *Attorney, Agent, or Firm*—Ostrolenk, Faber, Gerb & Soffen, LLP

(57) ABSTRACT

A telecom circuit protection apparatus includes a housing having at least first and second temperature responsive circuit protection devices, such as a fuse and a thyristor disposed therein. A first metal lead is connected to respective first terminals of the first and second circuit protection devices and is structured and arranged such as to transfer heat freely between the second circuit protection device and the first circuit protection device. A second metal lead is connected to a second terminal of the first device and a third metal lead is connected to a second terminal of the second device. The first, second and third metal leads extend from the housing. Advantageously, the portions of the first, second and third metal leads extending from the housing have reduced cross-sections to reduce heat loss from the apparatus and are formed and made solderable for use as connection points for surface mount connection to the apparatus. To protect multiple service lines, a circuit protector is provided for each of them. In this case, the multiple circuit protectors may advantageously be collocated in a common housing having either a common or separate ground terminal(s).

20 Claims, 2 Drawing Sheets

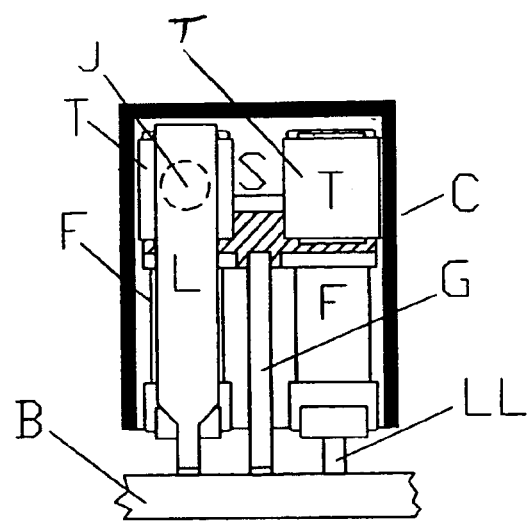
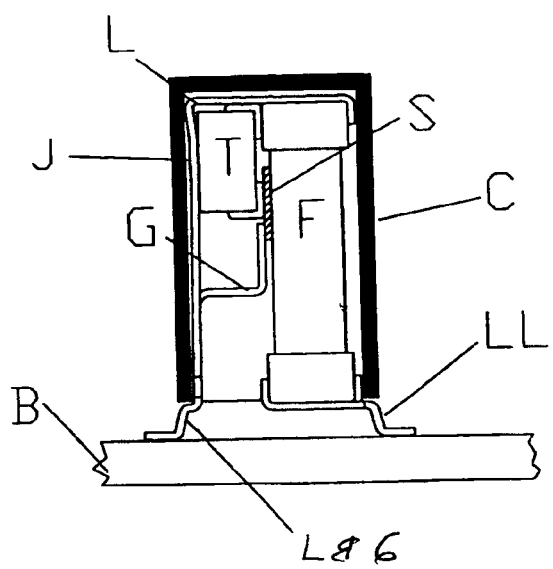
FIG. 1
FIG. 2
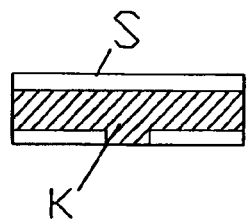
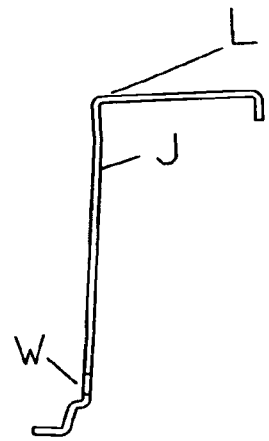
FIG. 3
FIG. 4

TELECOM CIRCUIT PROTECTION APPARATUS

CROSS REFERENCE TO RELATED APPLICATIONS

This application claims the benefit and priority of U.S. Provisional application Ser. No. 60/476,051, filed Jun. 4, 2003, and entitled "LINKING COMPONENTS' THERMAL PROPERTIES TO IMPROVE TELECOM PROTECTION CIRCUIT RESPONSES TO LIGHTNING SURGE AND POWER CROSS FAULTS", the entire disclosure of which is incorporated herein by reference.

BACKGROUND OF THE INVENTION

This invention relates to circuit protection apparatus and, more particularly, to telecom protection apparatus for the protection of telecom (telecommunications) equipment against diverse forms of abnormal, potentially dangerous line events such as lightning surge and power cross, protection against which dictates the application of contradictory design strategies.

Most telecom equipment that interfaces directly with the outside lines of service providers is required by regulatory agencies to employ protective measures against catastrophic failure or fire in the event that it is exposed to line anomalies, such as lightning surges or inadvertent line contacts with high voltage power feeds (power cross). A typical regulatory approach for equipment qualification (such as is put forth in Telcordia GR-1089) is to subject a device to a series of well-defined overload simulations representative of both types of anomalies. These specified tests are divided into two levels of severity; those that the protected equipment must survive without functional impairment and those under which it may fail so long as it presents no fire or safety hazard.

Designing protection circuits to handle both lightning surge and power cross faults with this defined dividing line between survival and controlled failure requires a balance between two, conflicting approaches. Lightning transients are high-energy events of very short duration that can induce very high current spikes at a level of several thousand volts. Power cross events usually involve contact with AC feeds carrying 600 volts or less and can exist for protracted periods. One typical solution for protecting against these diverse types of faults involves the insertion of a "transient tolerant" fuse or PTC (Positive Temperature Coefficient) device in series with one or both of a service line's feed wires (commonly designated as "Tip" & "Ring") along with a thyristor or other voltage clamping device placed between the equipment side of each fuse/PTC and a grounding point, thereby providing a fast response means of clamping excessive voltage at a safe level. Many circuit permutations exist, but the findamental requirement for one or more transient tolerant fuses/PTCs exists in each protection scheme.

To be suitable for this application, a fuse/PTC device must be able to conduct brief, high peak currents associated with lightning surges to an associated voltage clamping device without opening. This implies that the fusing element should have a high enough $I^2t$ (energy let-through) to preclude its opening when exposed to "acceptable" surge levels resulting in unwanted equipment failure. However, the fuse must also be responsive enough to open within a relatively short, specified time when exposed to an agency defined, low-level, overcurrent fault. Meeting this second requirement restricts the allowable current rating of the fuse, lowering its $I^2t$ which is roughly proportional to fuse element mass. These conflicting requirements severely constrain the design parameters of the fuse.

SUMMARY OF THE INVENTION

It is an object of the present invention to beneficially utilize the heat generated by a circuit protection device's voltage clamping component(s) under certain fault conditions. In particular, an object of the present invention is to employ material properties, thermodynamic principles and placement geometry to significantly enhance protection performance over prior art by allowing for the use of a more robust fusing device to better resist undesirable clearing when the apparatus is exposed to lightning surges within the suppression capabilities of its associated voltage clamping device, but exceeding regulatory survival thresholds. Due to aspects of the present invention, the fuse also retains the capability of opening within regulatory time limits when exposed to low current, power cross test conditions.

Another object of the present invention is to maximize the packaging density of the necessary protective circuit components such that the apparatus beneficially reduces the circuit board real estate required to add mandated protection to communications equipment.

Yet another object of the present invention is to reduce telecommunications equipment assembly cost by providing a modular, protection "solution" to equipment manufacturers that is both compatible with "surface mount" manufacturing techniques and can be automatically set on a circuit board in a single cycle using "pick & place" equipment.

These and other objects of the invention are achieved by a circuit protection apparatus which includes a housing having at least first and second temperature responsive circuit components, such as a thyristor and a fuse, disposed therein for each protected service line wire. A first metal lead is connected to respective first terminals of the first and second circuit protection devices and is structured and arranged such as to transfer heat from the second circuit protection device to the first circuit protection device. A second metal lead is connected to a second terminal of the first device and a third metal lead is connected to a second terminal of the second device. The first, second and third metal leads extend from the housing, with the first metal lead(s) intended for connection to the protected equipment, the second metal lead(s) intended for connection to the communications line and the third metal lead intended for connection to a suitable, electrical grounding point.

Other features and advantages of the present invention will become apparent from the following description that refers to the accompanying drawings.

BRIEF DESCRIPTION OF THE DRAWING(S)

FIG. 1 is an elevation view partly in cross-section and with a part removed for the sake of clarity of an embodiment of a telecom circuit protector illustrating certain features of the present invention.

FIG. 2 is a side view partly in cross-section of the telecom circuit protector of FIG. 1.

FIG. 3 is a front elevational view of a spacer forming part of the telecom circuit protector of FIGS. 1 and 2.

FIG. 4 is an end, elevation view showing the relaxed shape of a lead forming part of the telecom circuit protector of FIGS. 1 and 2.

DETAILED DESCRIPTION OF PREFERRED EMBODIMENTS OF THE INVENTION

Figure 5:
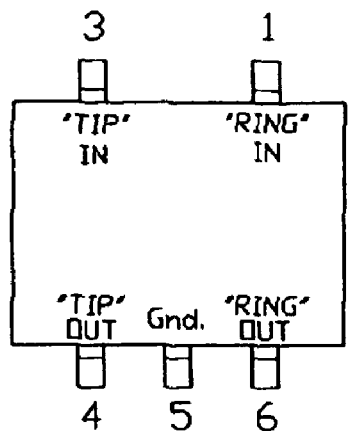
FIG. 5 is a top view showing the arrangement of the terminals of the telecom protector of FIGS. 1 and 2.

All electronic components liberate some heat when in use. In the case of fuses or PTC's, this heat is vital to proper function and is a focal point of the present invention. When enough current is passed through a fuse link or PTC, the heat internally produced is able to overcome losses through its end connections and its surface to its surroundings and its element temperature is able to reach its fusing/high resistance point, opening the fuse or driving the PTC into its current limiting mode.

A semiconductor device, such as a thyristor, also liberates heat when in its conducting state. Power dissipated is the product of its forward voltage drop and the current passing through it. Most of the heat produced is shed through the device's soldered connections, with a lesser portion carried off by its surroundings. Unlike a fuse, excessive temperature rise can impair a semiconductor's proper function. Device junction temperature must be held below its manufacturer's stated maximum. In accordance with the present invention, the thermal properties of these two electrically associated devices are conjoined through physical placement and thermodynamics to affect a symbiosis resulting in an apparatus having significantly improved protection characteristics over prior art.

A typical embodiment of a telecom circuit protection device illustrating certain features of the invention is shown in FIGS. 1–4. This embodiment shows protection for both wires of a service line feeding a telecommunications device and includes surge tolerant fuses (F) and voltage clamping devices, such as thyristors (T), serving as temperature responsive circuit protection devices for each of the wires. However, as should be appreciated, an embodiment using a single fuse and a single thyristor may be employed if only a single wire of the service line is to be protected. Conversely, more than two fuses and thyristors may be employed where it is desired to provide protection for more than one service line. In this instance, the multiple line protectors may terminate at a common ground, or be fitted with separate ground termination points.

Each of the surge tolerant fuses (F) is positioned vertically so that its lower cap is connected to the protected equipment's main circuit board (B) through a single lead of small cross section (LL) to minimize heat loss. This encourages the internal heat generated by a fault condition to gravitate to the upper region of the fuse through convection and a beneficial temperature gradient. The upper portion of each fuse's body has a thyristor (T) intimately bonded to it in a vertical orientation by a soldered connection between its upper terminal and the fuse's upper cap and by means of an insulative, thermally conductive, alignment (S) spacer of beneficial thickness (best shown in FIG. 3) having a solderable, electrically conductive pattern (K) printed thereon, situated between its lower terminal and the wall of the fuse (F).

A wide metal strip serving as lead (L) is fitted to the top cap of each of the fuses (F) and is bonded to the cap and the upper lead of the thyristor (T) associated with that fuse (F) using a solderjoint made with high temperature solder. Each of the leads (L) is folded down approximately 80 degrees and formed in such a way that it bears against the associated thyristor's thin top at the point (J) just above the semiconductorjunction when deflected inward at its base. When cased, each lead (L), which is made of a conductive, elastically deformable metal, functions as a leaf spring, preloaded by pressure at case exit point (W), thus forming an intimate thermal connection at (J). FIG. 4 shows a lead (L) in its relaxed shape. Although the thermal bond illustrated is shown as being mechanical in nature, it should be noted that an interface facilitator having high thermal conductivity, such as a heat sink compound, may be applied at (J) to provide an even more efficient heat path between the thyristor's junction and the fuse's upper cap. The thermal mass of widened strip (L) allows it to function as a transient heat sink for the thyristor's junction, thereby beneficially extending the time required to drive the junction temperature of the small device above its allowable maximum under fault conditions. At its bottom, each lead (L) is reduced to a small cross section and formed in such a way that it serves to electrically connect the junction between the upper cap of its associated fuse(F) and its associated thyristor (T) to the equipment-side circuitry of the main circuit board (B) while minimizing heat conduction thereto. Such forming may be "gull wing" (as shown), "J lead", or some other shape beneficial to the attachment of the apparatus to circuit board (B).

The lower leads of the thyristors (T) are attached using high temperature solder to a conductive, printed pattern (K) on the insulative spacer (S), that is, in turn, electrically connected to a ground point on the main circuit board (B) via a downlead (G) having a small cross section. Thus, both thyristors are connected to a ground point though the printed pattern (K) via a single lead. A case (C), having a flat top surface surrounds the entire structure to minimize heat transfer to the ambient environment and to provide beneficial means to automatically "pick & place" the protection apparatus in a single placement cycle.

Physically, the leads (L), (LL) and (G) terminate in terminals 1, 3, 4, 6 and 5, respectively, as shown in FIG. 5. Illustratively, the terminals 3 and 4 may represent the "TIP" In and Out terminals of the telecom protection apparatus and the terminals 1 and 6 may represent the "Ring" In and Out terminal.

Figure 6:
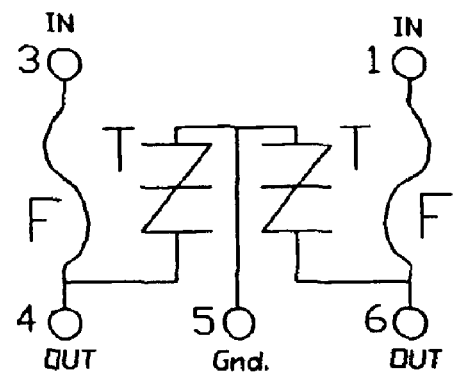
FIG. 6 is an electrical schematic of the telecom circuit protector of FIGS. 1 and 2.
Figure 7:
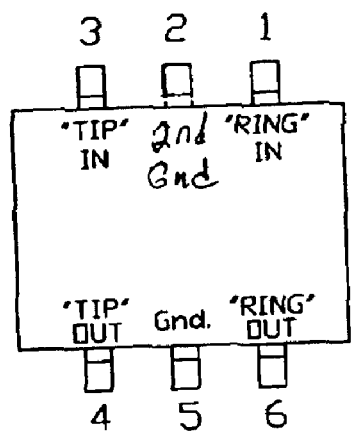
FIG. 7 is a top view showing the arrangement of the terminals of an alternative embodiment of the interconnections of the telecom protector of FIGS. 1 and 2.
Figure 8:
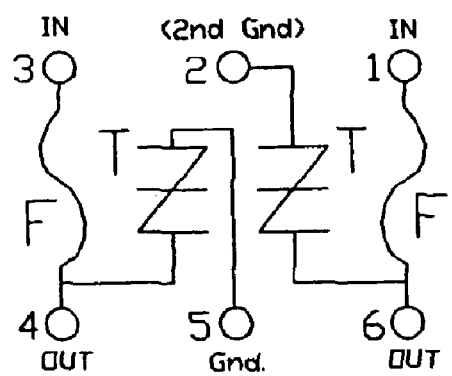
FIG. 8 is an electrical schematic of the alternative embodiment of the telecom circuit protector.

Electrically the fuses, thyristors and leads are interconnected as shown in FIG. 6. During normal operating conditions, signal current flow through a fuse is well below its carrying capacity and the associated thyristor remains in a non-conducting state since no over-voltage is present. Any heat gain within the fuse produced in this state would be easily dissipated through the leads connecting the device to the main circuit board.

Where it is desirable to provide separate ground connections, as where the circuit protector is to be used in an application requiring electrically isolated grounds for the individual wires, this may be effected by electrically isolating the thyristors from one another by beneficially splitting the printed pattern (K) on the spacer (S) and providing the thyristors with respective downleads (G). FIG. 7 shows the physical arrangement of the terminals for this embodiment and FIG. 8 is an electrical schematic therefor.

Under a low current, power cross line fault (e.g., 2.2 amps), the fuse element's temperature rises over time (as previously described) until clearing occurs. Five mechanisms are provided that act to speed this temperature rise as compared to that seen with conventional, electrically similar protection circuits constructed using discrete components.

The first mechanism is an increase in thermal isolation, achieved by using connecting leads of small cross section rather than soldering the individual surface mounted components to sizable pads on the thermal mass presented by a main circuit board or circuit-specific substrate.

A second mechanism metallically completes the primary heat distribution path running from the junction of a thyristor (T) through its internally bonded lead frame connection, to the upper cap of its associated fuse (F) and hence to the top of the internal element of the associated (F), without interruption. This unbroken, metallic path insures that heat transfer is maximized.

A third mechanism directs the additional heat presented at the top face of the case of a thyristor (T) to the upper portion of the associated fuse (F) by using the wide metal strip proximate to and bearing forcefully against the top of the thyristor (T)'s case and soldered to the conjoined masses of the upper cap of the fuse (F) and the thyristor (T)'s upper lead. The thermally conductive, bonded spacer (S) performs an ancillary function by concurrently transmitting the heat presented at the thyristor (T)'s lower terminal directly into the upper portion of the body of the associated fuse (F).

A fourth mechanism is enabled by mounting the fuse (F) in a vertical plane so that convection within the fuse (F) bodies and the presence of a high thermal mass affixed to the upper cap of the fuse (F) encourage the internal heat generated to migrate toward the upper portion of the fuse (F). Should the equipment on which the protection apparatus is mounted be oriented vertically when in use, thereby orienting the fuses horizontally, the aforementioned convective effect would be nullified but the beneficial temperature gradient provided by the aggregate thermal mass of the metal soldered to the upper fuse (F) cap would continue to attract heat even with the fuse (F) in a horizontal plane.

Lastly, the presence of a case (C) provides added heat retention by blocking airflow over any of the heated circuit. Additionally, the dimensions of the case are such as to minimize both the height of the circuit protector and the area generally referred to as the "real estate" it will occupy on a printed circuit board. The dimensions of the case are such that its lower rim deflects each lead (L) inward against its associated thyristor (T) during assembly of the apparatus into the case, thereby insuring an intimate thermal connection.

In aggregate, these thermal management mechanisms have been shown to reduce typical fuse clearing times at low overcurrent levels by up to 70%. This accelerated clearing under minimum power cross test conditions allows for the use of a more conservatively rated fuse having a higher $I^2t$ energy let-through capacity. This, in turn, improves survivability above that of the prior art when the protection apparatus is subjected to high current/short duration, pulses such as lightning surges, resulting in a protection solution having response characteristics that exceed regulatory minimum requirements for both types of fault conditions at both levels of test severity.

When exposed to short duration, high peak current fault conditions, the appended thermal mass provided by the wide downlead acts to draw heat away from the thyristor (T) junction during the transient event and to subsequently bleed it off through its necked down connection with the main circuit board. Additionally, under such events the fuse (F)'s body mass acts as thermal buffering, allowing it to work in concert with the metal downlead (L) and spacer (S) to blunt temperature rise in the associated thyristor (T), whose individual thermal mass is low. With faults of this type, it is the thyristor (T) that is called upon to dissipate a significant portion of the pulse energy injected into the circuit's input. Should its junction overheat due to inadequate heat sinking, failure might occur leaving the protected equipment either inoperable or vulnerable to subsequent lightning events. The present invention agglomerates the thermal masses of the individual protection circuits and ties them intimately together so they act in unison to hold down the semiconductor's peak temperature during this type of "fast transient" event.

Prior art designs have generally been restricted to protection circuit solutions involving discrete, serial placement of components on the equipment's main printed circuit board, or similar placement of the required circuits on small, "modular" circuit cards or substrates with connecting pins, designated as SIP (Single Inline Package) devices requiring hand inserted, "through hole" type installation. By way of contrast, the telecom protection apparatus herein described, in accordance with certain features of the present invention, is most easily configured as a DIP ( Dual Inline Package), making it readily compatible with standard, "surface mount" "pick & place" and "infrared reflow" soldering techniques. This compatibility allows for the installation of an SMT (Surface Mount Technology) protection circuit requiring minimal board space and a single placement cycle resulting in significant savings of both cost and circuit board "real estate".

Although the present invention has been described in relation to particular embodiments thereof, many other variations and modifications and other uses will become apparent to those skilled in the art. For example, various types of voltage clamping components may be used and PTCs may be used in lieu of fuses. Also, other physical configurations may be employed to arrange the protective circuit components such as to achieve the desired beneficial thermal interactions to produce an improved protection circuit response over prior art. Further, as noted, multiple line circuit protectors may be collocated in a common housing. In this case, the multiple circuit protectors may share a common ground terminal by extending the bonded spacer across them, or each may have its own ground terminal. It is preferred, therefore, that the present invention be limited not by the specific disclosure herein, but only by the appended claims.

What is claimed is:

1. A telecom circuit protection apparatus which comprises:

a housing;

at least a first temperature responsive circuit protection device disposed in the housing;

at least a second temperature responsive circuit protection device disposed in the housing;

a first metal lead connected to respective first terminal of the first and second circuit protection devices and structured and arranged such as to transfer heat from one circuit protection device to the other circuit protection device;

a second metal lead connected to a second terminal of the first device; and a third metal lead connected to a second terminal of the second device, the first, second and third metal leads extending from the housing, wherein the first lead overlies the first and second devices and is bonded to respective upper terminals of the first and second devices, the first lead being arranged in such a way that it bears against the first device to form a highly conductive thermal connection.

2. A telecom circuit protection apparatus according to claim 1, wherein the first circuit protection device is a fuse.

3. A telecom circuit protection apparatus according to claim 1, wherein the fuse is a surge tolerant fuse.

4. A telecom circuit protection apparatus to claim 1, wherein the first circuit protection device is a PTC protector.

5. A telecom circuit protection apparatus according to claim 1, wherein the second circuit protection device is a voltage clamping device.

6. A telecom circuit protection apparatus according to claim 5, wherein the voltage clamping device is a thyristor.

7. A telecom circuit protection apparatus according to claim 1, wherein the first lead is made of a conductive, elastically deformable material and is folded down approximately 80 degrees with its downward portion formed toward the second device such that it exerts a spring—biased force against the top of the second device to form a mechanically sustained, intimate thermal connection.

8. A telecom circuit protection apparatus according to claim 1, wherein the portions of the first, second and third metal leads extending from the housing have reduced cross sections and are formed and made solderable to serve as connection points for surface mounting of the apparatus to an external circuit.

9. A telecom circuit protection apparatus which comprises:
a housing;
at least first, second, third and fourth temperature responsive circuit protection devices disposed in the housing;
a first metal lead connected to respective first terminals of the first and second circuit protection devices and structured and arranged such as to transfer heat between the second circuit protection device and the first circuit protection device;
a second metal lead connected to respective first terminals of the third and fourth circuit protection devices and structured and arranged such as to transfer heat between the fourth circuit protection device and the third circuit protection device;
third and fourth metal leads connected to respective second terminals of the first and third circuit protection devices;
a fifth metal lead connected to the respective second terminals of the second and fourth circuit protection devices; and
the first, second, third, fourth and fifth metal leads extending from the housing,
wherein the first lead overlies the first and second devices and is bonded to respective upper terminals of the first and second devices, the first lead being arranged in such a way that it bears against the second device to form a mechanically sustained, intimate thermal connection and wherein the second lead overlies the third and fourth devices and is bonded to respective upper terminals of the third and fourth devices, the second lead being arranged in such a way that it bears against the fourth device to form a mechanically sustained, intimate thermal connection.

10. A telecom circuit protection apparatus according to claim 9, wherein the first and third circuit protection devices are fuses.

11. A telecom circuit protection apparatus according to claim 10, wherein the fuses are surge tolerant fuses.

12. A telecom circuit protection apparatus according to claim 9, wherein the first and third circuit protection devices are PTC protectors.

13. A telecom circuit protection apparatus according to claim 9, wherein the second and fourth circuit protection devices are voltage clamping devices.

14. A telecom circuit protection apparatus according to claim 13, wherein the voltage clamping devices are thyristors.

15. A telecom circuit protection apparatus according to claim 9, wherein the first lead is folded down 80 degrees with its downward portion formed in such a way that it bears against the second device, when assembled, to form a mechanically sustained intimate thermal connection and the second lead is folded down 80 degrees with its vertical portion formed in such a way that it bears against the fourth device, when assembled, to form a mechanically sustained, intimate thermal connection.

16. A telecom protection circuit apparatus according to claim 9, wherein the portions of the first, second, third, fourth and fifth metal leads extending from the housing have reduced cross sections and are formed and made solderable for use as connection points for surface mounting of the apparatus to an external circuit.

17. A telecom circuit protection apparatus, which comprises:
a housing;
a first fuse and a first temperature responsive voltage clamping device attached to the first fuse disposed in the housing;
a first lead overlying the first fuse and the first temperature responsive voltage clamping device and attached to respective upper terminals of the fuse and the first temperature responsive voltage clamping device, the first lead extending downwardly along and bearing against a side of the first temperature responsive voltage clamping device to form a mechanically sustained, intimate thermal connection;
a second lead attached to a second terminal of the first fuse;
a second fuse and a second temperature responsive voltage clamping device attached to the second fuse disposed in the housing;
a third lead overlying the second fuse and the second temperature responsive voltage clamping device and attached to respective upper terminals of the second fuse and the second temperature responsive voltage clamping device, the third lead extending downwardly along and bearing against a side of the second temperature responsive voltage clamping device to form a mechanically sustained, intimate thermal connection;
an insulative, thermally conductive spacer having a conductive, printed pattern thereon disposed between a lower terminal of the first temperature responsive voltage clamping device and a lower terminal of the second temperature responsive voltage clamping device, such spacer being attached to one of the lower terminals on one end of the spacer and attached to the other of the lower terminals on an opposite end of the spacer;
a fourth lead attached to a second terminal of the second fuse; and
a fifth lead attached to the printed pattern on the insulative spacer, the first, second third, fourth and fifth metal leads having lower ends extending from the housing.

18. A telecom circuit protection apparatus according to claim 17, wherein the portions of the first, second, third, fourth and fifth metal leads extending from the housing have reduced cross sections and are formed and made solderable for use as connection points for surface mounting of the apparatus to an external circuit.

19. A telecom circuit protection apparatus, which comprises:

a housing;

a first fuse and a first temperature responsive voltage clamping device attached to the first fuse disposed in the housing;

a first lead overlying the first fuse and the first temperature responsive voltage clamping device and attached to respective upper terminals of the fuse and the first temperature responsive voltage clamping device, the first lead extending downwardly along and bearing against a side of the first temperature responsive voltage clamping device to form a mechanically sustained, intimate thermal connection;

a second lead attached to a second terminal of the first fuse;

a second fuse and a second temperature responsive voltage clamping device attached to the second fuse disposed in the housing;

a third lead overlying the second fuse and the second temperature responsive voltage clamping device and attached to respective upper terminals of the second fuse and the second temperature responsive voltage clamping device, the third lead extending downwardly along and bearing against a side of the second temperature responsive voltage clamping device to form a mechanically sustained, intimate thermal connection;

an insulative, thermally conductive spacer having first and second electrically isolated conductive, printed patterns thereon disposed between the first and second temperature responsive voltage clamping devices such that the first conductive pattern is electrically connected to a lower terminal of the first temperature responsive voltage clamping device and the second conductive pattern is electrically connected to a lower terminal of the second temperature responsive voltage clamping device;

a fourth lead attached to a second terminal of the second fuse;

a fifth lead attached to the first conductive pattern on the insulative spacer and a sixth lead attached to the second conductive pattern on the insulative spacer, the first, second third, fourth, fifth and sixth metal leads having lower ends extending from the housing.

20. A telecom circuit protection apparatus according to claim 19, wherein the portions of the first, second, third, fourth, fifth and sixth metal leads extending from the housing have reduced cross sections and are formed and made solderable for use as connection points for surface mounting of the apparatus to an external circuit.

* * * * *